Jan. 7, 1958
C. R. LOCKWOOD
2,818,695
AXLE TUBE GRINDER
Filed Dec. 13, 1954
2 Sheets-Sheet 1
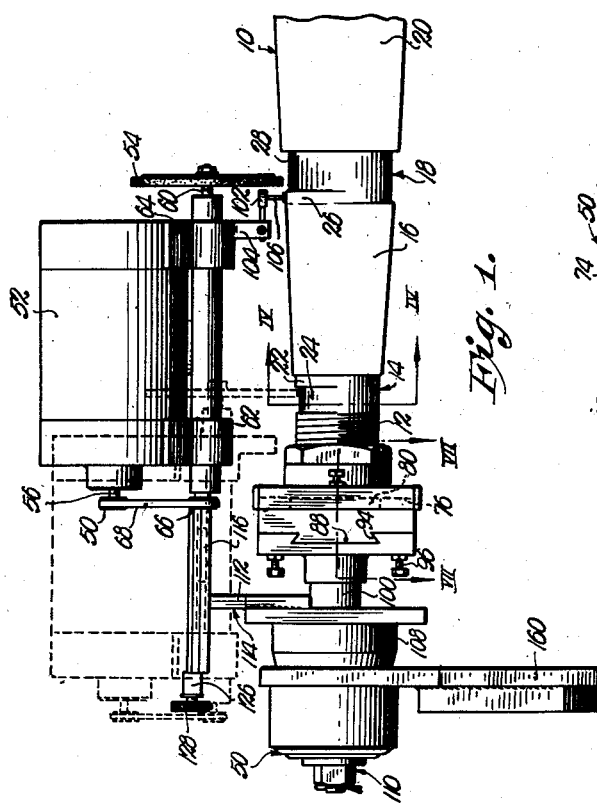
Fig. 1.
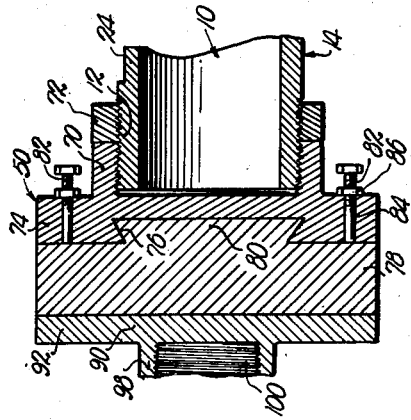
Fig. 7.
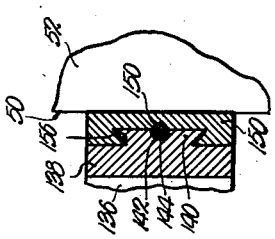
Fig. 8.
INVENTOR.
Charles R. Lockwood
BY
ATTORNEY.

Jan. 7, 1958
C. R. LOCKWOOD
2,818,695
AXLE TUBE GRINDER
Filed Dec. 13, 1954
2 Sheets-Sheet 2
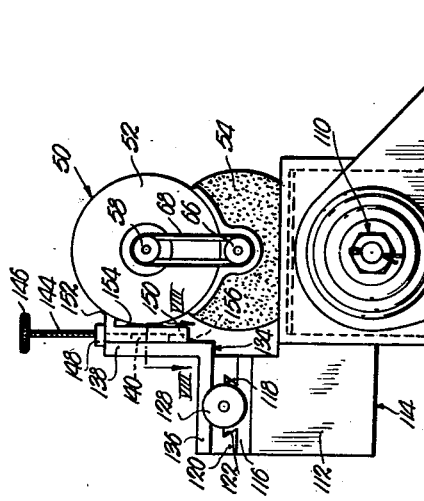
Fig. 2.
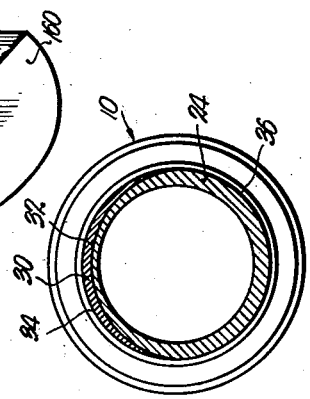
Fig. 6.
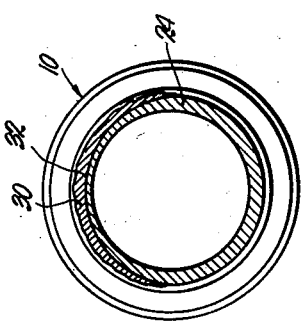
Fig. 5.
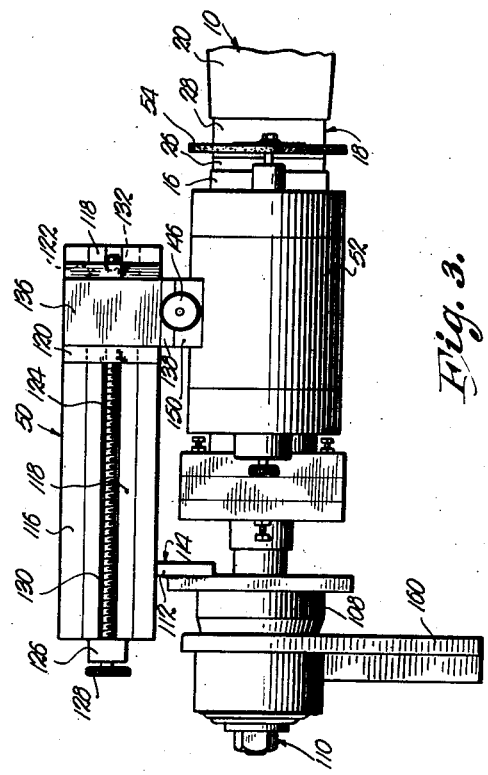
Fig. 3.
Fig. 4.
INVENTOR.
Charles R. Lockwood
BY
ATTORNEY.

United States Patent Office 2,818,695
Patented Jan. 7, 1958

2,818,695

AXLE TUBE GRINDER

Charles R. Lockwood, Drexel, Mo.

Application December 13, 1954, Serial No. 474,702

1 Claim. (Cl. 51—241)

This invention relates to the field of repairing metallic axle tubes or the like, having a bearing surface thereon and, more particularly, to a method for accomplishing such repair without replacement of the tube and to apparatus for performing the grinding operation which constitutes one of the steps of the method.

It is well known in the art that the wheel receiving bearing surfaces on axles and axle tubes used in motor vehicles, particularly heavy trucks, are subject to serious wear with use. It has heretofore been thought necessary when such bearing surfaces of an axle or axle tube became worn that the entire axle or tube, or at least some substantial part thereof, must be replaced. This is an expensive procedure both from the standpoint of the new parts required and from the standpoint of the time and labor required to effect the replacement.

Accordingly, it is the primary object of this invention to provide a method and apparatus for use in repairing worn axles, axle tubes and the like, without replacement thereof.

It is another important object of the invention to provide such a method and apparatus adapted for use in repairing a worn axle tube or the like without removing the same from the truck, trailer, or other vehicle or machine of which the axle tube or the like forms a part.

Another important object of the invention is to provide a simple and inexpensive method of repairing worn bearing surfaces and rendering the same as accurately formed as before they became worn by the fusing of metallic material upon the worn away portion of the bearing surface and then grinding away the excess of material so fused upon the bearing surface until the original bearing surface configuration is restored.

Another important object of the invention is to provide portable, simple and inexpensive grinding apparatus especially adapted for use with vehicle axles, axle tubes and the like, which apparatus may be used to accomplish its grinding functions with great accuracy without removal of the axle, axle tube or the like from the truck, trailer, or other machine of which it forms a part.

It is another important object of the invention to provide such apparatus including structure adapting the grinding wheel for complete revolution about an annular bearing surface to be ground.

It is another important object of the invention to provide such apparatus including means for accurately reciprocating the grinding tool either parallel to or perpendicularly to the central axis of an annular bearing surface to be ground for control of the depth and width of the grinding performed.

It is another important object of the invention to provide such apparatus which includes means for accurately centering the axis of pivot of the grinding tool relative to the central axis of an annular bearing surface to be ground.

Still other important objects of the invention, including certain important details of construction will be made clear or become apparent as the following description of the invention progresses.

In the accompanying drawings:

Fig. 1 illustrates an axle tube to be repaired having the apparatus of the invention installed thereon, it being noted that the axle tube is shown in a position inverted from that which would normally obtain when the axle tube is in place on a truck or the like, such inversion being utilized for convenience in arranging the figures and to illustrate that the apparatus may be used upon an axle tube or the like which has been removed from the truck of which it forms a part;

Fig. 2 is an end elevational view of the grinding apparatus contemplated by the invention looking from the end thereof that is remote from the end of an axle tube or other workpiece to be operated upon;

Fig. 3 is a plan view of the apparatus of the invention installed upon an axle tube or the like, taken from the top when the axle tube is separated from its truck or the like and disposed as in Fig. 1, or taken from the bottom when the axle tube is in place upon the truck of which it forms a part;

Fig. 4 is a cross sectional view taken on line IV—IV of Fig. 1 and illustrating the wear which occurs on the annular bearing surface of the axle tube, it being noted that the tube shown is in position inverted from that it would occupy when in place upon a truck or the like;

Fig. 5 is a cross sectional view similar to that of Fig. 4 but showing a layer of metallic material fused upon the worn portion of the initially annular bearing surface.

Fig. 6 is a cross sectional view similar to that of Fig. 5 but showing the bearing surface in repaired condition after the excess of the layer of fused material has been ground away to restore the bearing surface to annular condition;

Fig. 7 is a fragmentary cross sectional view taken on line VII—VII of Fig. 1; and Fig. 8 is a fragmentary cross sectional view taken on line VIII—VIII of Fig. 2.

Referring first to Figs. 1, 3, 4, 5, 6 and 7, the numeral 10 generally indicates an axle tube of a motor truck. As will soon become apparent, however, both the method and apparatus of this invention are well adapted for use with vehicle axles which are solid rather than tubular, as well as with other machine elements having a bearing surface subject to the same type of wear as axles and axle tubes. Accordingly, although the invention will be described for illustration with reference to the axle tube of a truck, its broader applicability is to be understood.

Tube 10 is illustrated as including an externally threaded end portion 12, a first annular bearing surface portion generally designated 14, an intermediate portion 16, a second annular bearing surface portion generally designated 18, and a remaining portion 20 which it will be understood is shown only fragmentarily in the figures and actually extends on into the vehicle for supporting the latter and terminating at its opposite end in another set of portions similar to those illustrated at 12, 14, 16 and 18. Outer, annular bearing portion 14 includes an unworn, annular area 22 and an area 24 which has been worn away to eccentric condition. Similarly, initially annular bearing surface portion 18 includes an unworn annular area 26 and a worn eccentric area 28. It may be noted that the wearing away of areas 24 and 28 resulting from continued engagement therewith of the bearing portion of the wheels of a truck supported by the axle tube 10, results in eccentricity or wearing away on the normally bottom side of the tube 10 since such side of the tube 10 is the one forced against the wheel bearings with greatest pressure due to the weight of the vehicle thereon. It may also be noted that the marginal areas 22 and 26 of surface portions 14 and 18 respectively are not worn away and retain their initial, carefully machined, annular configuration by virtue of the fact that the entire width of surface portions 14 and 18 are not normally engaged by the bearing surface of the wheels riding thereon; as will later become apparent, this fact is most useful in centering the apparatus of the invention upon the axle tube 10.

Referring now more specifically to Figs. 4, 5 and 6, the method contemplated by this invention may readily be explained as contemplating the steps of attaching a layer 30 of wear-resistant, metallic material upon the worn away segment face 32 of bearing area 24. It may be noted from Fig. 5 that such layer 30 is preferably of thickness greater than the part of segment face 32 worn away so that the radius of bearing area 24 throughout that part thereof corresponding with segment face 32 is greater than the initial radius of the annular bearing surface 14.

Layer 30 preferably comprises new metal fused upon bearing surface area 24 by the use of heat, for example, by welding, brazing or the like. The precise method currently preferred involving the successive welding upon segment face 32 of hardened steel or the like, until the welding has cumulated a layer 30 of the desired thickness.

The next step of the method involves the removal by degrees of the excess portion of layer 30 to restore the bearing surface of area 24 to annular configuration of proper dimension. Such removal of excess portions of layer 30 is preferably accomplished through abrasive action and, more particularly, through the use of a suitable grinding tool. As will be clear from Fig. 6, the new face 34 presented on layer 30 after grinding thereof melds with the face 36 of the remainder of bearing surface area 24 to present an annular bearing surface of the same radius as the unworn area 22 of bearing surface portion 14. Obviously, such method is equally applicable in repairing the worn away area 28 of bearing surface portion 18.

It will thus be apparent that the method contemplated by this invention is both simple and effective. It will also be appreciated, that, if suitable means for conveniently accomplishing the grinding step are available, the method can be performed with relative speed and, therefore, with a minimum of expense.

Accordingly, the other facet of this invention is to provide the apparatus by which a grinding operation such as is contemplated by the above-described method of the invention, can be accurately and conveniently performed. Turning attention particularly to Figs. 1, 2, 3, 7 and 8, the apparatus contemplated by the invention is generally designated by the numeral 50 and will be seen to broadly include a prime mover 52, a grinding tool 54, and structure for shiftably mounting the prime mover 52 and the grinding tool 54 on an axle tube 10, such structure to be hereinafter more fully identified and described.

Prime mover 52 is preferably an electric motor having a drive shaft 56 provided with a sheave 58 thereon. Grinding tool 54 preferably consists of an ordinary metal grinding wheel rigidly mounted on a rotatable shaft 60 journalled in bracket means 62 and 64 provided in motor 52, shaft 60 running parallel to shaft 56 of motor 52 and being provided with a sheave 66 in substantial alignment with sheave 58 on shaft 56. Sheave 58 on shaft 56 is operably connected with sheave 66 on shaft 60 by means of an endless belt or the like 68, it being noted that sheaves 58 and 66 could be replaced by step-cone type pulleys if desired to provide for adjustment of driving speeds for the grinding wheel 54. It may be significant to note that grinding wheel 54 is carried by brackets 62 and 64 for movement along with motor 52.

Internally threaded cap 70 is adapted for being threadably fitted onto externally threaded portion 12 of tube 10, and a lock nut 72 is provided for retaining cap 70 tightly in place upon portion 12 of tube 10. Cap 70 includes a plate portion 74 provided with a track groove 76 formed therein. Adjacent plate 74 is a second plate 78 provided with an elongated rail portion 80 received by track groove 76 of plate 74 and slidable relative thereto. One or more set screws 82 are threaded into bores 84 provided in plate 74 in such manner as when tightened to engage plates 78 and securely lock the same in a particular adjusted position. Set screws 82 are provided with lock nuts 86. Thus, since track groove 76 of plate 74 is straight, elongated and roughly perpendicular to the central axis of tube 10 when the cap 70 is installed on the latter, it is clear that rail portion 80 of plate 78 may be reciprocated in either direction along groove 76 and thereby relative to the central axis of tube 10 and then secured in place by the set screws 82. Plate 78 is also provided with an elongated rail portion 88 (as shown in Fig. 1), having its longitudinal axis perpendicular to the longitudinal axis of rail portion 80, the pair of rail portions 80 and 88 being on opposite sides of plate 78. A member 90 having a plate portion 92 provided with an elongated track groove 94 adapted to slidably receive rail portion 88 of plate 78 is provided and has set screws 96 threaded into plate portion 92 thereof for securely locking member 90 in reciprocated position relative to plate 78 in the same manner as explained for set screws 82.

Member 90 is provided with an internally threaded annular sleeve 98 which receives therein the externally threaded end portion of a pivot shaft 100. Threaded sleeve 98 is so disposed upon member 90 that the central axis of pivot shaft 100 will be roughly in alignment with the central axis of tube 10. By adjustment of plate 78 relative to plate portion 74 of cap 70, and by adjustment of plate portion 92 of member 90 relative to plate 78, the central axis of pivot shaft 100 may be exactly aligned with the central axis of tube 10, since the two adjustments mentioned permit bi-directional adjustment of the central axis of pivot shaft 100 relative to the central axis of tube 10 in either or both of two perpendicular directions. In accomplishing this operation of centering pivot shaft 100 with respect to tube 10, temporary use may conveniently be made of a conventional Starret dial indicator or comparable device 102 adapted to be releasably held by a bracket means 104 on the engine 52 or bracket 64 associated therewith. As is well known to those skilled in the art, such devices 102 are provided with a reciprocable sensing plunger 106 whose reciprocation may be read upon a finely calibrated dial (not shown), forming a part of the device 102. Obviously, bracket means 104 should be so located as to permit disposition of plunger 106 of device 102 for riding upon one or the other of unworn bearing surface areas 22 and 26. Since such bearing surface areas 22 and 26 are normally entirely unworn and, therefore, truly annular, the indications of device 102 while motor 52 is revolved about pivot shaft 100 as hereinafter explained, may be used as a guide in making the adjustments between member 90, plate 78 and cap 70 for exactly centering the central axis of pivot shaft 100 in alignment with the central axis of tube 10 (the central axis of tube 10 being assumed to coincide with the axis of revolution of initially annular bearing surface portions 14 and 18).

Rotatably mounted upon the pivot shaft 100 is a sleeve assembly 108, which may preferably be mounted upon shaft 100 by ball bearing means (not shown) and which may be retained upon the end of shaft 100 by any suitable retaining means as generally indicated at 110. Extending from sleeve 108 is the base leg 112 of a substantially T-shaped bracket or frame generally designated 114 and having an elongated cross element 116 extending parallel to the central axis of shaft 100 at a radial distance therefrom sufficient to clear member 90, plate 78 and cap 70. Since sleeve 108 is freely rotatable upon pivot shaft 100, it will be clear that cross element 116 of T-shaped frame 114 is free to revolve about the central axes of shaft 100 and tube 10; and since the longitudinal axis of cross element 116 is parallel to the central axis of shaft 100, it is clear that such longitudinal axis of cross element 116 will always remain both horizontal and parallel to the central axis of tube 10 (assuming proper alignment of pivot shaft 100 with tube 10), regardless of the position of rotation of sleeve 108 upon shaft 100.

As will be most clear from Figs. 2 and 3, cross element 116 is provided with a rail projection 118 extending longitudinally therealong. Slidably engaging element 116 is a plate 120 having a longitudinal track groove 122 therein adapted to slidably receive rail portion 118 of element 116. An elongated, threaded adjusting screw 124 is journalled on stationary element 116 as at 126 and provided with an adjusting knob 128. It will be noted that element 116 is provided with a longitudinal groove 130 of arcuate cross section for clearing screw 124. Plate 120 is provided with a threaded, semi-circular groove as indicated at 132, which threadably engages the exposed portion of adjusting screw 124 protruding from groove 130. This construction will be more clear from Fig. 8, which illustrates analogous mechanism hereinafter to be described. It will be apparent to those skilled in the art, however, that the plate 120 is rendered reciprocable along the longitudinal axis of element 116 by rotation of the screw 124 that is rotatably journalled by means 126 on element 116 and threadably engaged with groove 132 of plate 120.

An L-shaped member 134 is provided with a horizontal leg 136 rigidly mounted on plate 120 and with a perpendicular leg 138, which is elongated and has its longitudinal axis mutually perpendicular to the longitudinal and transverse axes of element 116 of frame 114. Leg 138 of member 134 is provided with a longitudinal rail portion 140 having a longitudinal groove 142 of arcuate cross section formed in such rail portion 140, as clearly illustrated in Fig. 8. An elongated threaded screw 144 provided with an adjustment knob 146 is rotatably journalled upon leg 138 by bearing means 148 and extends along groove 142 of rail portion 140 of leg 138. A bracket element 150 is rigidly secured to engine 52 by any suitable means such as welding as at 152 and 154 and is provided with a longitudinal track groove 156 adapted to receive rail portion 140 of leg 138 for sliding relative movement therebetween. Bracket element 150 is also provided with a threaded, semi-circular groove as at 158 which threadably engages the exposed portions of adjusting screw 144 protruding from groove 142 of rail portion 140 of leg 138. It will thus be apparent that the bracket element 150 carrying motor 52 along therewith is rendered reciprocable along the longitudinal axis of leg 138 by rotation of the screw 144 that is rotatably journalled by means 148 on leg 138 and threadably engaged with groove 158 of element 150. Thus, by rotation of screws 124 and 144 the motor 52, and accordingly grinding wheel 54, may be moved respectively either longitudinally of tube 10 or toward and away therefrom.

It may be noted that most of the structure of the apparatus 50 thus far described may be preferably formed of cast aluminum or the like. Nevertheless, the weight of motor 52 and the mounting structure associated therewith will possess a substantial weight relative to the axis of pivot shaft 100. Accordingly, a counterweight 160 is provided and mounted on sleeve 108 in radially extended relationship to the latter. Such counterweight 160 should obviously extend from sleeve 108 in a direction, and should obviously itself be of such weight as to balance the weight of the remaining structure of the apparatus 50 relative to the axis of rotation thereof about pivot shaft 100.

Lastly, it is noted that the dimensions of frame 114 and member 134 are such that when screw 144 is adjusted the central axis of shaft 160 will move toward and away from tube 10 substantially radially of the latter for the type of tube 10 most often operated upon. Where this is the case, the adjusting screw 144 may be conveniently calibrated, as in thousandths of an inch, to indicate the quantitative variation in depth of grinding cut effected by any change in the position of the screw 144.

It will now be manifest that the apparatus described is ideally suited for performing a grinding step such as called for by the method also contemplated by this invention. It will be equally clear, however, that many minor modifications and changes could well be made from the exact structure disclosed for purposes of illustration without departing from the true spirit and intention of this invention. Accordingly, it is to be understood that this invention shall be deemed limited only by the scope of the appended claim.

Having thus described the invention, what is claimed as new and desired to be secured by Letters Patent is:

Apparatus for grinding an arcuate, external bearing surface upon an elongated axle tube or the like, said apparatus comprising: a grinding tool; a prime mover; means operably coupling the prime mover with the grinding tool; and structure adapted to be mounted on a generally cylindrical end portion of said tube having a central axis longitudinal to the tube and displaced from said surface thereof for mounting the tool and the prime mover directly and solely upon said portion of the tube for swinging movement relative to the tube, said structure including a cap directly connected with said portion of the tube, a frame assembly upon which the prime mover and the tool are mounted, and means pivotally mounting said assembly on said cap, said last-mentioned means including a plurality of successively interconnected, relatively reciprocable members, one of said members being fixedly mounted on the cap, and a pivot shaft mounted on the member most remote from the cap, said frame being pivotally mounted on said shaft, said members being relatively shiftable substantially perpendicularly to said axis to permit centering of the pivot shaft in alignment with said axis.

References Cited in the file of this patent

UNITED STATES PATENTS

| | | |
|---|---|---|
| 1,748,343 | Gustafsson | Feb. 25, 1930 |
| 1,857,873 | Ross | May 10, 1932 |
| 1,902,188 | Schmidt et al. | Mar. 20, 1933 |
| 1,997,639 | Hetherington et al. | Apr. 16, 1935 |
| 2,257,619 | Prill | Sept. 30, 1941 |
| 2,297,074 | Rohrdanz | Sept. 29, 1942 |
| 2,463,580 | Warshyk et al. | Mar. 8, 1949 |
| 2,561,589 | Newton | July 24, 1951 |
| 2,675,655 | Strait | Apr. 20, 1954 |

FOREIGN PATENTS

| | | |
|---|---|---|
| 286,089 | Great Britain | Mar. 1, 1928 |

OTHER REFERENCES

"Sprayed Metals are Finished by Grinding" (Reasby), vol. 34, No. 9 Grits and Grinds, pages 6–12, published by Norton Co., Oct. 28, 1943. (Copy in Div. 58.)

Oxy-Acetylene Tips, Oct. 1943, pages 133–135, published by the Linde Air Products Co. (Copy in Div. 14.)